US012039295B2

(12) United States Patent
Allamanis et al.

(10) Patent No.: US 12,039,295 B2
(45) Date of Patent: Jul. 16, 2024

(54) CODE COMPLETION WITH HOLES

(71) Applicant: MICROSOFT TECHNOLOGY LICENSING, LLC., Redmond, WA (US)

(72) Inventors: Miltiadis Allamanis, Cambridge (GB); Daya Guo, Zhuhai (CN); Shao Kun Deng, Bellevue, WA (US); Neelakantan Sundaresan, Bellevue, WA (US); Alexey Svyatkovskiy, Bellevue, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 377 days.

(21) Appl. No.: 17/321,414

(22) Filed: May 15, 2021

(65) Prior Publication Data

US 2022/0374208 A1    Nov. 24, 2022

(51) Int. Cl.
*G06F 9/44* (2018.01)
*G06F 8/33* (2018.01)
*G06F 8/41* (2018.01)
*G06N 3/084* (2023.01)

(52) U.S. Cl.
CPC .............. *G06F 8/33* (2013.01); *G06F 8/427* (2013.01); *G06N 3/084* (2013.01)

(58) Field of Classification Search
None
See application file for complete search history.

(56) References Cited

U.S. PATENT DOCUMENTS

| 6,799,718 | B2 | 10/2004 | Chan et al. |
| 8,732,660 | B2 | 5/2014 | Neill et al. |
| 10,635,414 | B2 | 4/2020 | Gulwani et al. |
| 2014/0282375 | A1 | 9/2014 | Gulwani et al. |
| 2019/0220253 | A1 | 7/2019 | Pradhan et al. |
| 2020/0097261 | A1* | 3/2020 | Smith .................. G06F 40/174 |
| 2020/0104102 | A1 | 4/2020 | Brockschmidt et al. |
| 2020/0249918 | A1 | 8/2020 | Svyatkovskiy et al. |

(Continued)

FOREIGN PATENT DOCUMENTS

WO    2021021322 A2    2/2021

OTHER PUBLICATIONS

Chakraborty et al., "CODIT: Code Editing with Tree-Based Neural Models," arXiv (Year: 2020).*

(Continued)

*Primary Examiner* — Insun Kang

(57) ABSTRACT

A code completion tool uses a neural transformer model with attention to generate syntactically-correct candidates with holes to complete a partially-formed code snippet. The model is trained to predict the expansion of non-terminal symbols of the production rules of the underlying grammar of the code snippet without being constrained to a left-to-right expansion order. A hole is a non-terminal symbol of the grammar of a programming language that marks a position in a candidate where the code completion engine is not certain of the production rule that should be used to expand the non-terminal symbol. The hole allows the code completion engine to expand other non-terminal symbols in a candidate and allow the user to guide the expansion of the holes in a candidate.

20 Claims, 12 Drawing Sheets

(56) References Cited

U.S. PATENT DOCUMENTS

2021/0357187 A1    11/2021    Clement et al.

OTHER PUBLICATIONS

Wang et al. ("Towards Full-line Code Completion with Neural Language Models") 2020 (Year: 2020).*
Ginzberg et al., "Automatic Code Completion" (Year: 2017).*
Svyatkovskiy et al., "IntelliCode Compose: Code Generation using Transformer", arXiv (Year: 2020).*
Svyatkovskiy et al., "Pythia: AI-assisted Code Completion System" (Year: 2019).*
Allamanis, et al., "Mining Idioms from Source Code", In Proceedings of the 22nd ACM SIGSOFT International Symposium on Foundations of Software Engineering, Nov. 16, 2014. pp. 472-483.
Bielik, et al., "PHOG: Probabilistic Model for Code", In Proceedings of the 33rd International Conference on Machine Learning, Jun. 19, 2016, 10 Pages.
Casalnuovo, et al., "Studying the Difference Between Natural and Programming Language Corpora", In Journal of Empirical Software Engineering vol. 24, Issue 4, Aug. 2019, 46 Pages.
Cohen, et al., "Spectral Learning of Latent-Variable PCFGs", In Proceedings of the 50th Annual Meeting of the Association for Computational Linguistics (vol. 1: Long Papers), Jul. 8, 2012, pp. 223-231.
Dong, et al., "Coarse-to-Fine Decoding for Neural Semantic Parsing", In Repository of arXiv:1805.04793v1, May 12, 2018, 12 Pages.
Ford, et al., "The Importance of Generation Order in Language Modeling", In Repository of arXiv:1808.07910v1, Aug. 23, 2018, 6 Pages.
Gu, et al., "Levenshtein Transformer", In Repository of arXiv:1905.11006v1, May 27, 2019, 16 Pages.
Hellendoorn, et al., "Global Relational Models of Source Code", In Proceedings of International Conference on Learning Representations, Apr. 26, 2020, pp. 1-12.
Lee, et al., "Deterministic Non-Autoregressive Neural Sequence Modeling by Iterative Refinement", In Repository of arXiv:1802.06901v1, Feb. 19, 2018, 10 Pages.
Liu, et al., "A Token-level Reference-free Hallucination Detection Benchmark for Free-form Text Generation", In Repository of arXiv:2104.08704v1, Apr. 18, 2021, 14 Pages.
Maddison, et al., "Structured Generative Models of Natural Source Code", In Proceedings of the 31st International Conference on Machine Learning, Jun. 18, 2014, 9 Pages.
Malmi, et al., "Encode, Tag, Realize: High-Precision Text Editing", In Repository of arXiv:1909.01187v1, Sep. 3, 2019, 14 Pages.
Parisotto, et al., "Neuro-Symbolic Program Synthesis", In Proceedings of 5th International Conference on Learning Representations, Apr. 24, 2017, 14 Pages.
Puduppully, "Data-to-Text Generation with Content Selection and Planning", In Proceedings of the AAAI Conference on Artificial Intelligence, vol. 33, Jul. 17, 2019, pp. 6908-6915.
Stern, et al., "Insertion Transformer: Flexible Sequence Generation via Insertion Operations", In Repository of arXiv:1902.03249v1, Feb. 8, 2019, 10 Pages.
Vaswani, et al., "Attention Is All You Need", In Proceedings of the 31st Conference on Neural Information Processing Systems, Dec. 4, 2017, 11 Pages.
Welleck, et al., "Non-Monotonic Sequential Text Generation", In Repository of arXiv:1902.02192v1, Feb. 5, 2019, 20 Pages.
Yin, et al., "A Syntactic Neural Model for General-Purpose Code Generation", In Proceedings of the 55th Annual Meeting of the Association for Computational Linguistics (vol. 1: Long Papers), Jul. 30, 2017, pp. 440-450.
Shenwai, Tanushree, "OpenAI Releases New Version of GPT-3 and Codex That Can Edit or Insert Content Into Existing Text", Retrieved from: https://www.marktechpost.com/2022/03/21/openai-releases-new-version-of-gpt-3-and-codex-that-can-edit-or-insert-content-into-existing-text%EF%BF%BC/, Mar. 21, 2022, 3 Pages.
Brockschmidt, et al., "Generative Code Modeling with Graphs", In Repository of arXiv:1805.08490v2, Apr. 16, 2019, 24 Pages.
"International Search Report and Written Opinion Issued in PCT Application No. PCT/US22/026082", dated Jul. 19, 2022, 15 Pages.
Lewis, et al., "BART: Denoising Sequence-to-Sequence Pre-training for Natural Language Generation, Translation, and Comprehension", In Journal of Computing Research Repository, Oct. 2019, 10 Pages.
Liu, et al., "Neural Code Completion", In Proceedings of 5th International Conference on Learning Representations, Apr. 2017, 14 Pages.
Mens, et al., "Using Annotated Grammars for the Automated Generation of Program Transformers", In Proceedings of the 3rd Days on Model-Driven Engineering, Nov. 13, 2006, 16 Pages.
Mukherjee, et al., "Searching a Database of Source Codes Using Contextualized Code Search", In Repository of arXiv:2001.03277v1, Jan. 10, 2020, 15 Pages.
"International Search Report and Written Opinion Issued in PCT Application No. PCT/US23/022444", dated Aug. 9, 2023, 11 Pages.
Office Action Received for European Application No. 22723298.0, dated Dec. 22, 2023, 3 pages.

* cited by examiner

CODE COMPLETION WITH HOLES

BACKGROUND

Software development environments are often used to aid software developers (i.e., users, programmers, etc.) to develop program code. The software development environment may include a source code editor and other tools that a developer utilizes to write and test their programs. Some software development environments include a code completion feature that provides assistance while the developer is editing code by automatically presenting a list of possible candidates based on one or more characters (e.g., letters, symbols, etc.) that a developer has typed into a source code editor. A popup menu may appear with several suggested code elements that the developer may utilize. This assistance is beneficial since it speeds up the development time and reduces common errors, such as typos.

The automatic code completion feature may be problematic when the code completion system generates realistic-looking content that is incorrect. The incorrect candidate confuses the user, introduces errors and negatively impacts the user's experience with the software development environment.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A code completion system predicts syntactically-correct candidates to complete a partially-formed source code snippet that include one or more hole. A hole represents where the code completion system is uncertain as to the expansion of a non-terminal symbol. The hole allows the code completion system to expand each non-terminal symbol in a candidate without being constrained to a left-to-right expansion order. In this manner, the system generates source code candidates that are syntactically-correct with a higher precision instead of stopping the expansion when probabilities of the generated tokens are below a confidence threshold thereby causing the system to fail to complete the rest of the candidate.

The code completion system utilizes a neural transformer model with attention with a bidirectional encoder and an auto-regressive decoder with a non-terminal annotation facility to predict a syntactically-correct candidate with one or more holes rather than generating a truncated sequence of tokens.

The neural transformer model with attention is trained with a supervised training dataset of partial code states of a source code program. A partial code state corresponds to a linearization of the leaves of a partially-expanded syntax tree of a source code program. The partial code state includes at least one non-terminal symbol. The model is trained through application of the partial code states to learn the production rules of a grammar of a programming language in order to predict the most likely non-terminal symbol to expand and the most likely production rule to perform an expansion.

During inference, a nested beam search is used to find the most likely candidate to complete a partially-formed source code snippet by performing the most likely expansions predicted by the neural transformer model with attention.

The top k candidates are then presented to the user. In this manner, the user is given an entire structure (e.g., statement, method, etc.) rather than a truncated portion of a candidate which provides a better user experience with the code completion system.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Figure 1:
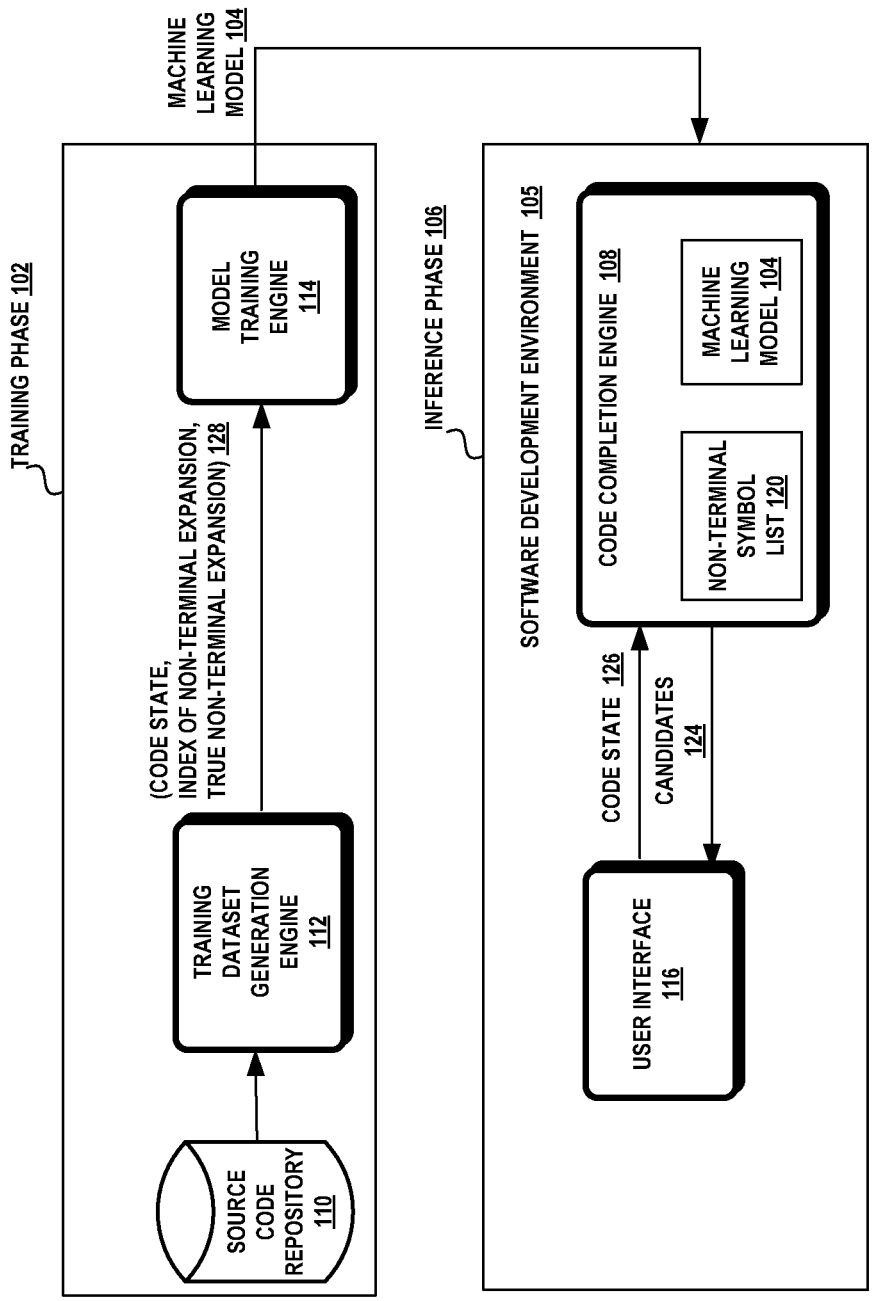
FIG. 1 illustrates an exemplary code completion system having a training phase that generates a neural transformer model and an inference phase that uses the neural transformer model to predict most likely expansions to apply to complete a partially-formed code snippet.

A code completion system is disclosed that generates source code candidates predicted to complete a source code snippet with holes. Code completion is a tool that attempts to predict the next string of characters that a developer (e.g., user, end-user, programmer, etc.) may type into a source code editor. Source code consists of various elements (e.g., keywords, delimiters, variables, methods, constants, operators, etc.) that are combined in a particular order in accordance with the grammar of the underlying programming language. A hole represents where the code completion system is uncertain about the element or elements that should be placed in a particular position in the candidate to reflect the user's intent.

Consider an assignment expression written in the Python programming language: res=some_var.foo(a+b.bar( ), blah=False). As the user is typing in a source code editor the characters res=, a prior code completion system would generate the candidate, res=some_var.foo(a+, which is incomplete. The system is stuck when it gets to a position where it cannot predict the next token and, in this case, generates a partially-completed candidate. The system has an early stopping mechanism which stops generating tokens when the probability of the next token to complete the candidate is below a certain confidence threshold. This is because the system is constrained to generating tokens or terminals starting from the left-most symbol to the right-most symbol of a production rule.

The technique described herein is not constrained to a left-to-right generation of tokens and can generate a complete syntactically-correct sequence of tokens with holes to denote uncertainties. For example, the following candidates with holes (< > denotes a "hole") are generated to complete the expression res=without being subject to the left-to-right constraint of prior systems:

res=some_var.foo(<expression>,blah=False)

res=some_var.foo($a+$<expression>,blah=False)

res=some.var.foo(<expression>,blah=<expression>)

The user then selects the candidate sequence that represents what the user intends to write. The system then proceeds to complete each hole by generating more candidates. The additional candidates may have an entire syntactically-correct sequence of terminal symbols or tokens or a syntactically-correct sequence with one or more holes. In this manner, the system is able to generate a candidate sequence with a higher precision of achieving what the user intends to write.

The technique described herein relies on the production rules of the grammar of a programming language to predict the syntactically-correct code to complete a partially-written code snippet. A context-free programming language relies on its context-free grammar to describe how to construct syntactically-correct source code. A context-free grammar, G, is defined by a 4-tuple, G=(V, T, R, S), where V is the set of non-terminal symbols, T is the set of terminal symbols, R is the set of production rules of the grammar, and S is the start non-terminal symbol used to represent the entire program. A terminal symbol is a symbol that appears in the strings generated by the grammar. A terminal symbol never appears on the left-hand side of a production rule and is always on the right-hand side. A non-terminal symbol is a placeholder for patterns of symbols that can be generated by the non-terminal symbols. A non-terminal symbol always appears on the left-side of a production rule. A production rule is a rule for replacing a non-terminal symbol. A grammar is context-free if a production rule can be applied regardless of the context of a non-terminal.

The technique described herein relies on a machine learning model to generate code to complete a code snippet based on the production rules or grammar of the programming language. The model learns how to expand the production rules through a supervised training dataset of tuples. A tuple includes a partial code state, a non-terminal index to expand, and the outcome of the expansion. During training, the model learns the one-step expansion of a production rule by modeling a probability distribution, p (expansion|c, s), where c is the partial code state and s is the index of the non-terminal being expanded.

When the model is deployed in a code completion system, a nested beam search uses the model to generate all expansions of each non-terminal symbol of a partially-formed source code snippet one at a time. The nested beam search consists of an outer beam search and an inner beam search. In the outer beam search, the model predicts the top k most likely expansions for each non-terminal of the original input sequence one at a time. For each of the top k most likely expansions, the inner beam search generates at most k new code states by expanding the non-terminal symbol with either a non-terminal symbol or a terminal symbol in accordance with a learned production rule. The new code states are expanded in the outer beam search until a sequence contains only terminal symbols or a confidence threshold is reached. The probability for a fully expanded sequence or candidate includes the aggregation of the probabilities of each expansion. The top m best code states are kept and output to the user.

Attention now turns to a further discussion of the system, devices, components, and methods utilized in the system of code completion with holes.

System for Code Completion with Holes

FIG. 1 illustrates a block diagram of an exemplary code completion system 100 in which various aspects of the invention may be practiced. As shown in FIG. 1, system 100 includes a training phase 102 in which components are used to train a machine learning model, such as a neural transformer model with attention 104, and an inference phase 106 that utilizes the model 104 in a software development environment 105.

The training phase 102 may utilize one or more source code repositories 110, a training dataset generation engine 112 and a model training engine 114. In one aspect, the model 104 is trained to learn the production rules of a particular programming language. The model 104 is trained from a training dataset that consists of tuples derived from various source code programs from various source code repositories 110. A source code repository 110 may be a file archive and web hosting facility that stores large amounts of source code either privately or publicly. The source code repository 110 can be structured as a version control system, such as GIT, Mercurial, etc.

The training dataset generation engine 112 extracts source code programs from the various source code repositories 110 to construct tuples to train the model 104. In one aspect, a tuple includes a partial code state, a position of a non-terminal position to expand, and the true non-terminal expansion 128. The model training engine 114 applies the tuples of the training dataset to the neural transformer model to learn how to expand the production rules of the programming language.

Once the model is trained and validated, the model is deployed in a software development environment 105, such as a source code editor or integrated development environment (IDE). The software development environment 105 includes a user interface 116 and a code completion engine 108 that includes the model 104 and a list of the non-terminal symbols 120 of the grammar of a target programming language.

As a user is developing and editing source code, a code completion engine 108 assists the user in generating candidates to complete a partially-formed code snippet. A partially-formed code snippet is an incomplete source code statement or group of statements, such as a few characters, a line of source code, a method or a program. The code completion engine 108 is given a partially-expanded syntax tree of the partially-formed code snippet as a code state 126. The code completion engine 108 uses the machine learning model 104 to predict the remaining part of the partially-formed code snippet or produces a candidate having holes where a hole corresponds to non-terminal symbols that need to be expanded further 124.

It should be noted that FIG. 1 shows components of the system in one aspect of an environment in which various aspects of the invention may be practiced. However, the exact configuration of the components shown in FIG. 1 may not be required to practice the various aspects and variations in the configuration shown in FIG. 1 and the type of components may be made without departing from the spirit or scope of the invention.

Attention now turns to a discussion of the neural transformer model with attention.

Neural Transformer Model Architecture

Figure 2:
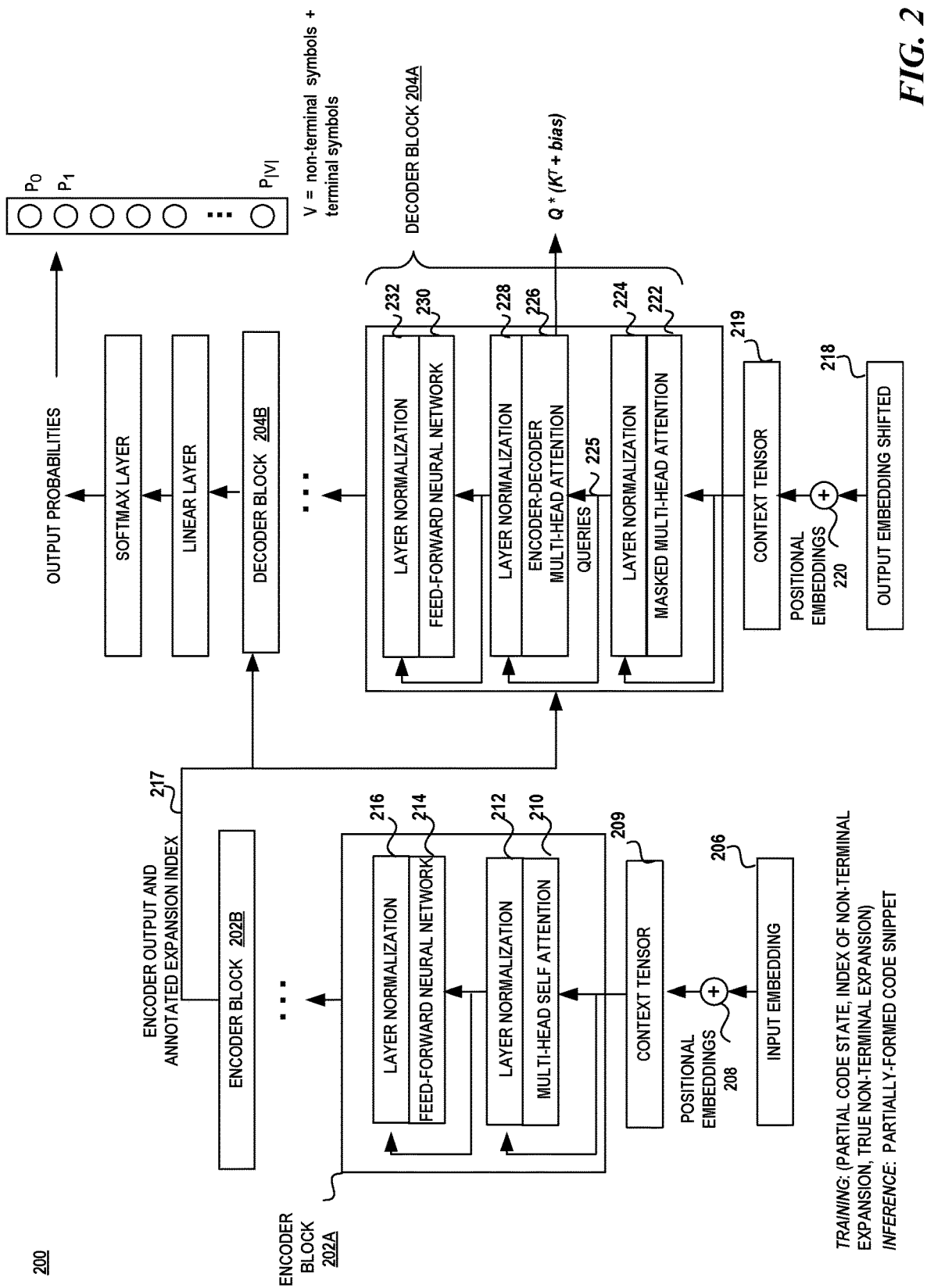
FIG. 2 is an exemplary architecture of a neural transformer model with attention.

FIG. 2 shows an exemplary architecture of the neural transformer model with attention. A neural transformer with attention is a distinct type of machine learning model. Machine learning pertains to the use and development of computer systems that are able to learn and adapt without following explicit instructions, by using algorithms and statistical models to analyze and draw inferences from patterns in data. Machine learning uses different types of statistical methods to learn from data and to predict future decisions. Traditional machine learning includes classification models, data mining, Bayesian networks, Markov models, clustering, and visual data mapping.

Deep learning differs from traditional machine learning since it uses multiple stages of data processing through many hidden layers of a neural network to learn and interpret the features and the relationships between the features. Deep learning embodies neural networks which differs from the traditional machine learning techniques that do not use neural networks. Neural transformers models are one type of deep learning that utilizes an attention mechanism. Attention directs the neural network to focus on a subset of features or tokens in an input sequence thereby learning different representations from the different positions of the tokens in an input sequence. The attention mechanism provides the model with a better capability to learn the task at hand thereby generating more accurate predictions of the candidate method bodies.

The neural transformer model 200 contains one or more encoder blocks 202A-202B ("202") coupled to one or more decoder blocks 204A-204B ("204"). The initial inputs to an encoder block 202 are the input embeddings 206 of an input sequence of a training dataset. In order to retain the order of the tokens in the input embedding 206, positional embeddings 208 are added to the input embedding 206 forming a context tensor 209. The initial inputs to the decoder block 204 are a shifted sequence of the output embeddings 218 from a previous time step to which the positional embeddings 220 are added forming context tensor 219.

An encoder block 202 consists of two layers. The first layer includes a multi-head self-attention component 210 followed by layer normalization component 212. The second layer includes a feed-forward neural network 214 followed by a layer normalization component 216. The context tensor 209 is input into the multi-head self-attention component 210 of the first encoder block 202 with a residual connection to the layer normalization component 212. The output of the layer normalization component 212 is input to the feed-forward neural network 214 with another residual connection to layer normalization component 216. The output of the encoder block 202 is a context tensor or set of hidden representations 217. The set of hidden representations 217 is then sent through additional encoder blocks. At the last encoder block, a context tensor 217 is sent to the decoder 204.

Attention is used to decide which parts of the input embedding are important for each token, especially when decoding long sequences since the encoder is limited to encoding a fixed-size vector. Attention mechanisms gather information about the relevant context of a given token and then encode that context into a vector which represents the token. It is used to identify the relationships between tokens in the long sequence while ignoring other tokens that do not have much bearing on a given prediction.

The multi-head self-attention component 210 takes a context tensor 209 and weighs the relevance of each token represented in the context tensor 209 to each other by generating attention weights for each token in the input embedding 206. In one aspect, the attention function is scaled dot-product attention which is described mathematically as follows:

$$\text{Attention}(Q, K, V) = \text{softmax}\left(\frac{QK^T}{\sqrt{d_k}}\right)V,$$

where the input consists of queries Q and keys K of dimension $d_k$, and values V of dimension $d_v$. Q is a matrix that contains the query or vector representation of one token in a sequence, K is the vector representations of all tokens in the sequence, and V is the vector representations of all the tokens in the sequence.

The queries, keys and values are linearly projected h times in parallel with $d_v$ output values which are concatenated to a final value:

$$\text{MultiHead}(Q,K,V)=\text{Concat}(\text{head}_1, \ldots ,\text{head}_h)W^O,$$

where $\text{head}_i=\text{Attention}(QW_i^Q,KW_i^K,VW_i^V),$ with parameter matrices $W_i^Q \in \mathbb{R}^{d_{model}\times d_k}$, $W_i^K \in \mathbb{R}^{d_{model}\times d_k}$, $W_i^V \in \mathbb{R}^{d_{model}\times d_k}$, and $W^O \in \mathbb{R}^{hd_v\times d_{model}}$.

In order to reduce the training time of the neural transformer, layer normalization is used between the layers. The layer normalization components 212, 216 normalize the inputs across the features. The mean and standard deviation is computed across the feature dimensions.

The feed-forward neural network 214 processes each output encoding separately. The output of the top encoder block is a set of attention vectors K and V 217 which is used by the encoder-decoder multi-head attention layer 226 of the decoder block 204.

The decoder block 204 predicts a token $t_i$ representing a symbol in the grammar of the target programming language one-by-one at each time step conditioned on all previously-generated target tokens $t_1, \ldots t_{i-1}$. A decoder block 204 consists of three layers. The first layer includes a masked multi-head attention component 222 followed by a layer normalization component 224. The output of the layer normalization component 225 is input into the encoder-decoder multi-head attention component 226 with a residual connection to layer normalization component 228. The second layer includes an encoder-decoder multi-head attention component 226 followed by a layer normalization component 228. The third layer includes a feed-forward neural network 230 followed by a layer normalization component 232. The output of layer normalization component 228 is input into the feed-forward neural network 230 with a residual connection to layer normalization component 232.

The masked multi-head attention component 222 receives the output embeddings of the previous timestep. The masked multi-head attention component 222 masks the output embeddings from future time steps. The encoder-decoder multi-head attention layer 222 receives queries from the previous decoder layer and the memory keys and values 217 from the output of the encoder block 202. In this manner, the decoder block 204 can attend to every position of the input sequence. The feed-forward neural network 230 processes each output encoding separately. A layer normalization component 224, 228, 232 is used between the layers in order to normalizes the inputs across the features.

In one aspect, the neural transformer model contains a stack of six encoder blocks and a stack of six decoder blocks which are aggregated into a neural transformer block. The output of each encoder block is passed onto the next encoder block and processed. Each decoder block receives the attention weights computed from the last encoder block. The use of multiple stacked encoder blocks and decoder blocks increases the model's capacity allowing the model to learn increasing levels of abstraction.

During the training phase, the model is trained to learn the one-step expansion of a non-terminal symbol in an input training sequence. An input training sequence includes a partial code state, the non-terminal index of the non-terminal to expand for the given code state along with the true non-terminal expansion. In one aspect, the context tensor output by the last encoder block 217 consists of an encoder output (e.g., keys, values) and the expansion index represented as a one-hot vector that denotes which non-terminal to expand. Specifically, the last row of the matrix of the output of the last encoder block 202B is replaced with the one-hot vector that denotes which non-terminal to expand.

The encoder-decoder multi-head attention component 226 receives the encoder output annotated with the expansion index, 217 and generates an attention score that includes a bias term towards expanding the non-terminal at the indicated index, modifying the key-query term of self-attention to $Q*(K^T+bias)$, where bias is a matrix containing zeros everywhere except from the column whose index corresponds to the non-terminal being expanded.

During the inference phase, the input sequence includes a code state of a partially-formed source code snippet. The encoder's output 217 includes the keys and values computed by the encoder blocks and an annotated expansion index. The encoder-decoder multi-head attention component 226 computes the attention score as in the training phase.

Methods

Attention now turns to description of the various exemplary methods that utilize the system and device disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 3:
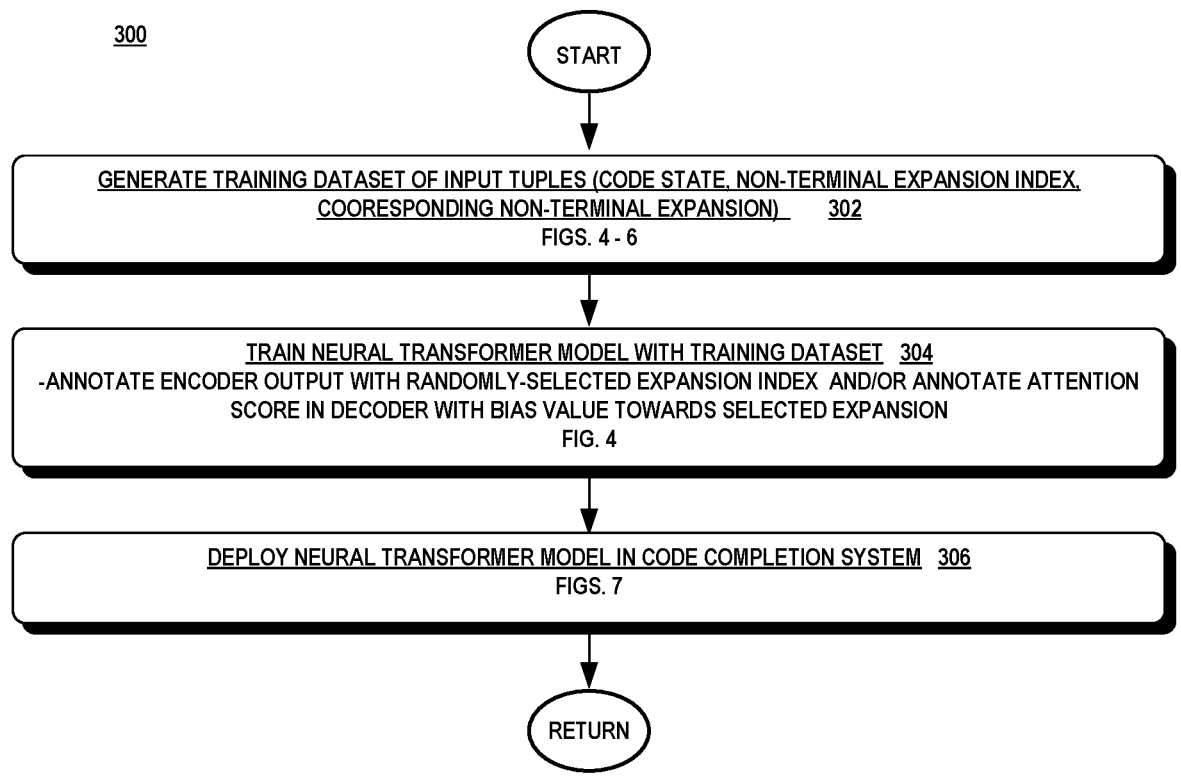
FIG. 3 is a flow diagram illustrating an exemplary method for developing and deploying the system for code completion.

Referring to FIG. 3, there is shown an exemplary method 300 of the code completion system. The training dataset generation engine generates a training dataset of tuples which is used to train the neural transformer model to learn to predict the expansion of a non-terminal symbol based on the current context of the program (block 302). The model training engine applies the training dataset to train the model (block 304). Upon completion of the model training and validation, the model is deployed into a code completion system (block 306).

Figure 4:
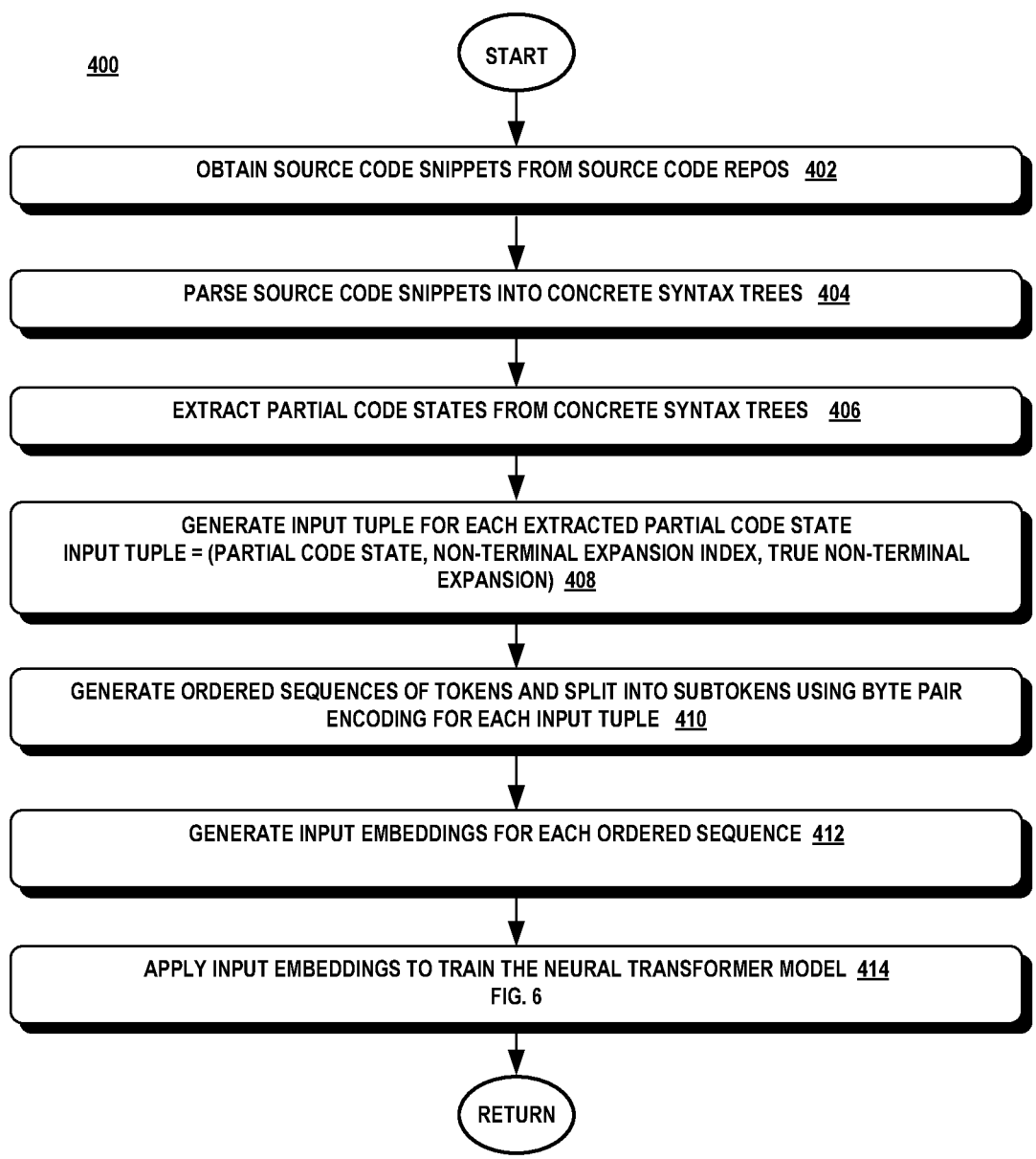
FIG. 4 is a flow diagram illustrating an exemplary method for generating the training dataset.

Turning to FIG. 4, there is shown an exemplary method 400 of the training dataset generation engine for generating the training dataset. The training dataset generation engine obtains source code snippets from various source code repositories (block 402). The source code snippets are written in the same programming language (block 402).

The training dataset generation engine transforms each of the selected source code programs into a concrete syntax tree. A concrete syntax tree represents the syntactic structure of a program in a hierarchical or tree structure. The concrete syntax tree is an n-ary tree data structure that includes nodes that represent a construct in the grammar of the programming language of a program. The concrete syntax tree includes one root node, multiple internal nodes, and multiple terminal nodes. The terminal nodes represent the terminal symbols. The terminal symbol represents an operand or an operator. The non-terminal nodes represent elements of the grammar on the left-side of a production rule. (Collectively, block 404).

The training dataset generation engine extracts partial code states from the concrete syntax tree. A partial code state represents a linearization of the leaves of a partially-expanded syntax tree. A partial code state contains at least one non-terminal symbol that has yet to be expanded. Expansion pertains to the application of a production rule to a non-terminal symbol. (Collectively, block 406).

Figure 5A:
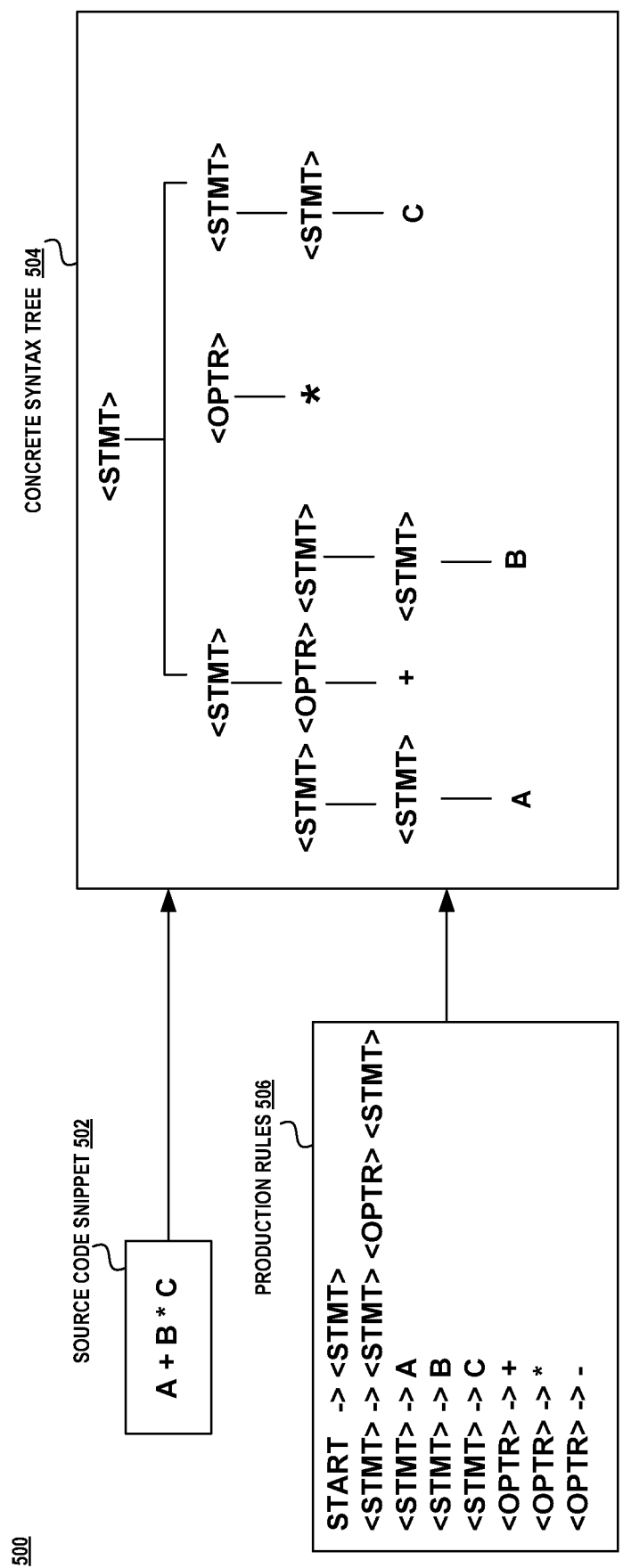
FIGS. 5A-5B are schematic diagrams illustrating the construction of a partial code state.
Figure 5B:
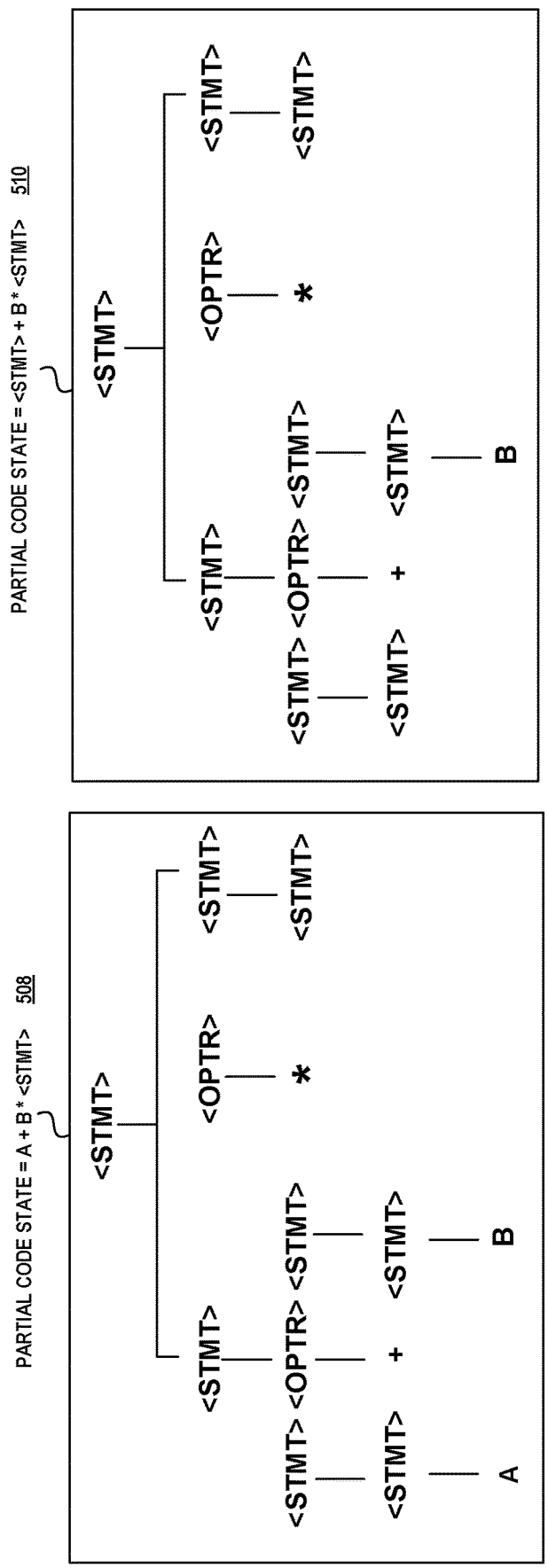

FIGS. 5A and 5B depict an illustration of the generation of partial code states. Turning to FIG. 5A, there is shown a source code snippet for the code statement, A+B*C, 502. A concrete syntax tree 504 is generated for the source code snippet 502 using the production rules 506 of the grammar of the associated programming language.

In the example shown in FIG. 5A, there are eight production rules. The non-terminal symbols include <STMT> or statement and <OPTR> or operator. The terminal symbols include A, B, C, *, +, and −.

The production rule START→<STMT> expands the START state to the non-terminal symbol <STMT>. The production rule <STMT>→<STMT><OPR><STMT> expands the non-terminal symbol <STMT> with the non-terminal symbols <STMT><OPR><STMT>. The production rule <STMT>→A, expands the non-terminal symbol STMT with the terminal symbol A, the production rule <STMT>→B, expands the non-terminal symbol STMT with the terminal symbol B and the production rule <STMT>→C, expands the non-terminal symbol STMT with the terminal symbol C. The production rule <OPTR>→*, expands the non-terminal symbol OPTR to the terminal symbol *, the production rule <OPTR>→+ expands the non-terminal symbol OPTR to the terminal symbol +, and the production rule <OPTR>→−, expands the non-terminal symbol OPTR to the terminal symbol −.

In a context-free grammar, each production rule is applied to each non-terminal symbol by starting from the left-most symbol of a production rule and applying the translation noted in the right-hand side of the production rule. The production rule START→<STMT> is applied first and then the non-terminal <STMT> is expanded using additional production rules until only non-terminal symbols remain. The application of the production rules implicitly creates the concrete syntax tree 504.

FIG. 5B illustrates two exemplary partial code states constructed from the concrete syntax tree shown in FIG. 5A. It should be noted that there are additional partial code states and that these are shown for illustration purposes and should not be construed as limiting the example to the partial code states shown.

The training dataset generation engine traverses the concrete syntax tree to extract partial code states. A partial code state is a partially-expanded concrete syntax tree that includes at least one non-terminal. There are two partial code states shown in FIG. 5B, A+B*<STMT> 508 and <STMT>+B*<STMT> 510. The concrete syntax tree shown in 508 contains all the leaf nodes of the fully-expanded syntax tree except where the non-terminal <STMT> has not been expanded to terminal symbol C. The concrete syntax tree shown in 510 contains all the leaf nodes of the fully-expanded tree except where <STMT> expands to the terminal symbol A and <STMT> expands to the terminal symbol C.

Turning back to FIG. 4, for each partial code state, an input tuple is formed consisting of the partial code state, a non-terminal expansion index, and a true non-terminal expansion. The non-terminal expansion index represents the position of the non-terminal that the model learns to expand. The non-terminal expansion index is randomly selected and does not adhere to any particular order, such as a left-to-right expansion order. (Collectively, block 408).

Each input tuple is then tokenized and split into subtokens using byte-level byte-pair encoding. Byte-level byte-Pair Encoding (BPE) is used to generate the vocabulary used by a neural transformer model. A text string, either a sequence of source code or a natural language text, is represented as a sequence of Unicode Transform Format, UTF-8 bytes. The input text string of subtokens is encoded as a sequence of UTF-8 bytes, where a subtoken is encoded into one to four bytes. A byte sequence is then partitioned into byte-level subwords, referred to as byte n-grams. (Collectively, block 410).

The byte-level subwords are generated using the BPE algorithm. The vocabulary is seeded with 256 American Standard Code for Information Interchange (ASCII) characters and then greedily grown by adding the merge of the most common pair of consecutive tokens in each iteration. This type of encoding does not rely on knowing the underlying language making it suitable for an input sequence of text strings that contain source code and/or natural language text. The ordered sequences of UTF-8 bytes are translated into a T-ordered sequence of subtokens which are vector representations of a source code fragment or natural language text. The T-ordered sequence of subtokens is represented in a context vector. (Collectively, block 410).

The T-ordered sequences of tokens are then mapped into numeric vectors and then into an embedding. An embedding is a learned representation for the text-based tokens/subtokens where tokens or subtokens that have a common meaning have a common representation. There is an embedding for each token/subtoken in the vocabulary and a position embedding. The token/subtoken embedding represents the learned representation for the token/subtoken. The transformer model does not read each token/subtoken sequentially and as such, has no knowledge of the token/subtoken's position in a sequence without additional position information. The position embedding is used to embed position information about a token/subtoken's position in a sequence into the transformer model. (Collectively, block 412).

The token/subtoken embeddings are input to the model training engine to train the neural transformer model (block 414).

Attention now turns to a discussion of training the model with the training dataset.

Training the Model

Neural networks are trained iteratively, making multiple passes over the training dataset before converging to a minimum. An epoch represents the entire training dataset passed forwards and backwards through the neural network once. Since the training dataset is very large, it is partitioned into smaller batches. The training is iterative and the entire dataset is passed through the neural network in multiple iterations. Each training iteration includes forward propagation, loss calculation, backpropagation steps followed by updating the weights.

The neural network has multiple layers so that more detailed relationships within the data are learned as well as how the features interact with each other on a non-linear level. The model architecture, training procedure, data normalization and vocabulary encoding procedures are hyperparameters that are tailored to meet a particular objective. The values of the hyperparameters influence how the parameters are learned.

In one aspect, the hyperparameters may include the following: (1) token/subtoken and position embedding layers of dimensions: 30000×768, and 1024×768 respectively; (2) twelve transformer blocks, with each block consisting of two convolutions, masked self-attention and layer normalization layers; (3) for the training procedure: auto-regressive, with a cross-entropy loss optimization objective; the sequence length is 1024 tokens/subtokens; the mini-batch size is 8; the gradient accumulation steps for each weight update is 8; the Adam stochastic optimization procedure is used to train the neural network; and the learning rate is 0.0001; (4) the data normalization procedure: normalize all string and numerical literals, keeping the ten most frequent; and (5) the vocabulary encoding procedure: extract joint subtoken vocabulary using byte-pair encoding, preserve the ten most frequent string and numerical literals encoding them as a single token during byte-pair encoding procedure; and introduce special tokens to denote end-of-file, dedent, and indent symbols.

Figure 6:
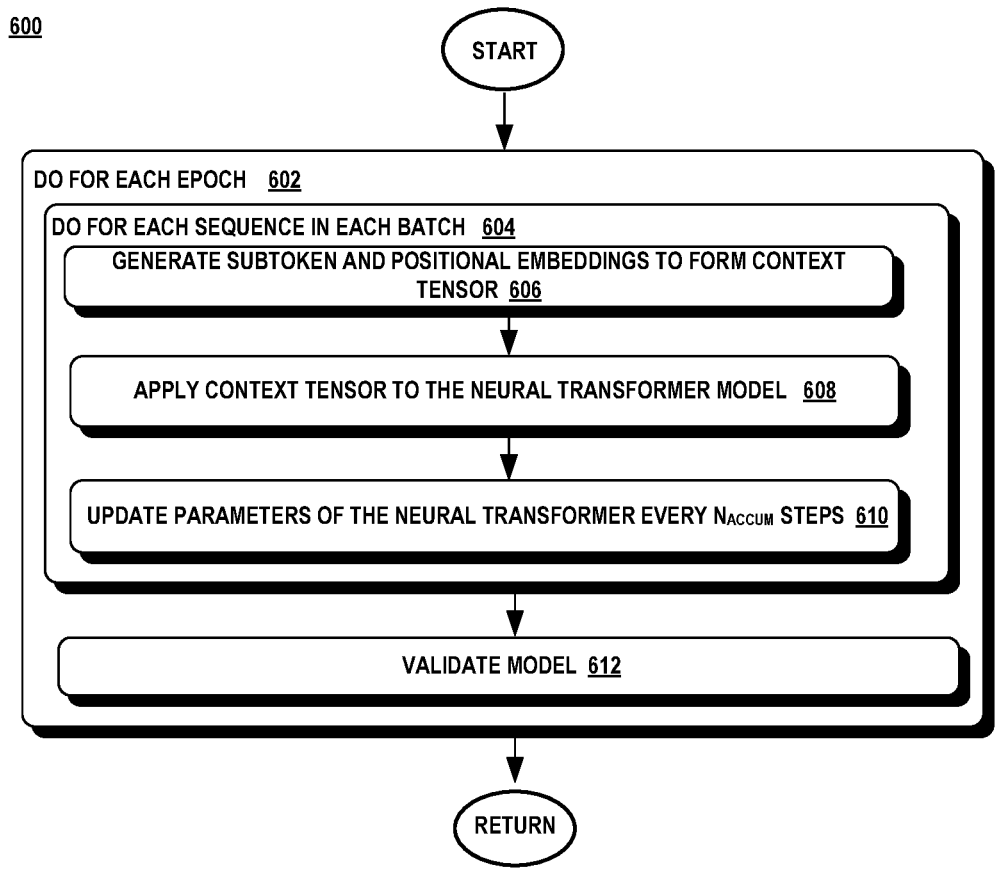
FIG. 6 is a flow diagram illustrating an exemplary method for applying the training dataset to train the neural transformer model.

FIG. 6 shows an exemplary method 600 for training the neural transformer model. The training dataset is partitioned into batches with each batch of sequences running through the training process. The sequences are initially transformed into numeric vectors and then embeddings. An embedding is a mapping of discrete categorial variables to a vector of continuous numbers. There is a token/subtoken embedding and a positional embedding for each input sequence. The token/subtoken embeddings represent the tokens and/or subtokens in an input sequence and the positional embeddings represents the order of a token/subtoken in an input sequence.

Initially, random values are used for the initial values of each token/subtoken embedding and positional embedding. Thereafter, the neural transformer model learns the values for each embedding. Upon the completion of the training phase, the embeddings for each token/subtoken and the position embeddings are saved into respective matrices for later use in the inference phase. There is a token/subtoken embedding matrix, $W_e$, that contains an embedding vector for each token/subtoken $C_i$, i=0 . . . V, and a positional embedding matrix, $W_p$, that contains an embedding vector $P_j$, j=0 . . . T, for each position, where V is the size of the vocabulary and T is the length of the input context tensor.

Each token/subtoken embedding and its corresponding positional embedding are combined to form a context tensor. A tensor is a mathematical object that has indices and components that follow certain transformation rules. It is a generalization of vectors and matrices and represented as an n-dimensional array. The tensor in this instance represents a context of a source code program. The size of the context tensor is T×size of the embedding vector (e.g., embedding size), where T is the length of the token/subtoken sequence.

For each sequence of each batch in each epoch (blocks 602, 604), the T-ordered sequences of subtokens are then mapped into numeric vectors and then into respective subtoken embeddings and positional embeddings (block 606). An embedding is a learned representation for the text-based subtokens where subtokens that have a common meaning have a similar representation. An embedding is a mapping of discrete categorical variables to a vector of continuous numbers. There is an embedding for each subtoken in the vocabulary and a corresponding positional embedding. The subtoken embedding represents the learned representation for the subtoken. The neural transformer model does not read each subtoken sequentially and as such, has no knowledge of the subtoken's position in a sequence without additional position information. The positional embedding is used to embed position information about a subtoken's position in a sequence into the neural transformer model.

Initial values are generated for the subtoken embedding and positional embeddings of each sequence which are then used to form a context tensor. Thereafter, the neural transformer model learns the values for each embedding. Upon the completion of the training phase, the embeddings for each subtoken and the positional embeddings are saved into respective matrices for later use. There is a subtoken embedding matrix, We, that contains an embedding vector for each subtoken $t_i$, i=0 ... V, and a positional embedding matrix, Wp, that contains an embedding vector $P_j$, j=0 ... T, for each position, where V is the size of the vocabulary and T is the length of the subtoken sequence. (Collectively, block 608).

The first encoder block of the neural transformer model takes the context tensor as input and passes it through the multiple layers of multi-head self-attention layer normalization and feed-forward neural network to finally produce a set of hidden representations If there are additional encoder blocks, the output of each encoder block is passed onto the next encoder block with the output of the last encoder block producing the context tensor of a set of hidden representations. The set of hidden representations is passed onto each decoder block. (Collectively, block 608).

The decoder blocks of the neural transformer models take a shifted sequence of an output embedding as input. The masking in the masked multi-head attention layer is used to prevent positions from attending to subsequent positions in the future. The masking combined with the output embeddings shifted by one position ensures that the predictions to position T depend only on the known outputs at positions less than T. Starting with the first token of the output sequence, the subtokens are passed through the self-attention and normalization layers and into the encoder-decoder attention layer, serving as the query for encoder-decoder attention, where the key and value pairs for the attention are the outputs of encoder. The encoder output was calculated with the entire input embedding sequence. (Collectively, block 608).

The feed forward neural networks in the encoder blocks and the decoder blocks are trained iteratively, making multiple passes over the training dataset before converging to a minimum. Each training iteration includes forward propagation, loss calculation, backpropagation steps followed by updating the weights by calculating the weight gradients. The loss function estimates the loss or error which is used to compare how good or bad the predicted results are. In one aspect, a categorical cross-entropy loss function is used. Once the loss is calculated, it is propagated backwards to the hidden layer that contributed directly to the output. In backpropagation, the partial derivatives of the loss function with respect to the trainable parameters are determined. The weight gradients are calculated as the difference between the old values and the new values of the weights. The weights are adjusted to make the loss as small as possible using a gradient descent technique. In one aspect, a Stochastic Gradient Descent (SGD) method is the optimization algorithm used to find the values of parameters of the function that minimizes the loss function. A backpropagation through time (BPTT) algorithm may be used to update the weights. (Collectively, block 608).

At the completion of each batch, the parameters of the neural transformer model are updated at a preconfigured frequency denoted as Naccum. Naccum is a gradient accumulation frequency and in one aspect has a value of 4. The parameters include the subtoken embeddings and the positional embeddings which are stored in a respective embedding matrix. (Collectively, block 610).

Next, the neural transformer model with attention is validated. Before the neural transformer model with attention is trained, a set of hyperparameters is selected randomly and then tuned to achieve a desired performance. The neural transformer model with attention is tested using a validation dataset to determine the appropriate hyperparameters settings to achieve a desired goal. When the desired goal is not achieved, one or more hyperparameters are adjusted and the training is repeated until the target goal is achieved. Perplexity on the validation set is calculated to validate the performance of the model with respect to the learning the masked out original text. (Collectively, block 612).

Attention now turns to a discussion of the inference phase which uses the neural transformer model with attention to predict candidates with holes to complete a source code snippet.

Inference Phase

Figure 7:
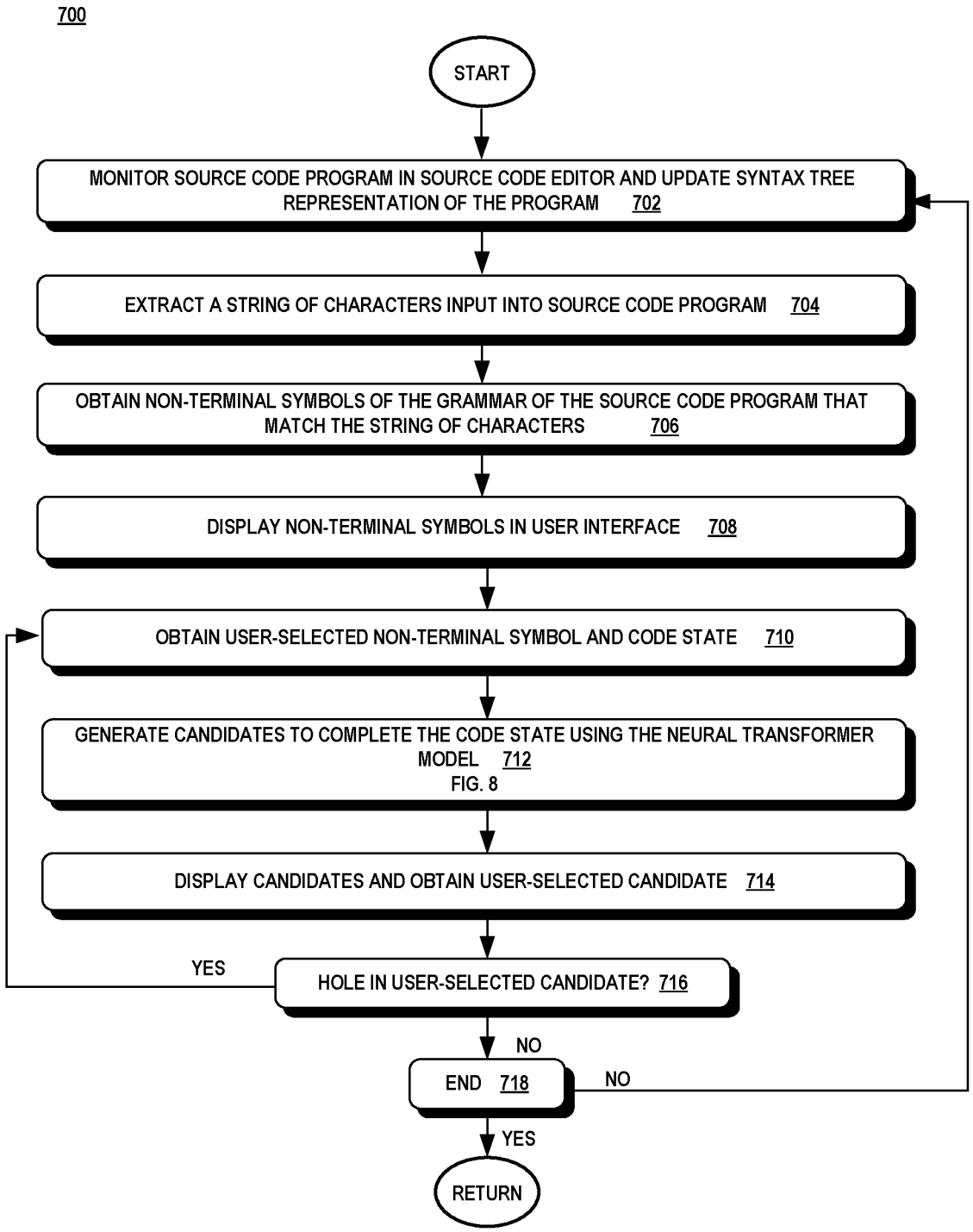
FIG. 7 is a flow diagram illustrating an exemplary method for generating candidates to complete a partially-formed code snippet with a hole.

Turning to FIG. 7, there is shown an exemplary method 700 to generate candidates likely to complete a source code snippet in a source code editor. In one aspect, a code completion engine of a source code editor runs a background process to monitor the characters input by a user into a source code program in the editor (block 702). The background process continuously updates a syntax tree representing the source code program based on the user's actions in the editor (block 702).

As the user is typing in the characters, the string of characters is extracted by the code completion engine (block 704) and used to search a list of non-terminal symbols of the grammar of the programming language. The non-terminal symbols matching the extracted string of characters (block 706) is then displayed in the user interface of the source code editor (block 708).

The user then selects one of the non-terminal symbols that matches what the user intends to write (block 710). In addition, the code completion engine extracts the code state of the source code (block 710). A code state may consist of the previous 100 tokens preceding the non-terminal symbol, the current source code line or statement, the entire method, or the entire program or file.

The code completion engine generates the most likely candidates to complete the code state using a nested beam search with the neural transformer model (block 712). The candidates are displayed to the user and the user selects a particular candidate which is input into the source code program (block 714). If there are holes in the user-selected candidate (block 716—yes), the process is repeated (blocks 710-716) until there are no more holes in a candidate or confidence threshold is exceeded (block 716—no). If there are no holes in the user-selected candidate (block 716—no), the process is repeated (blocks 702-716) until the user ends the edit session (block 718—yes).

Figure 8:
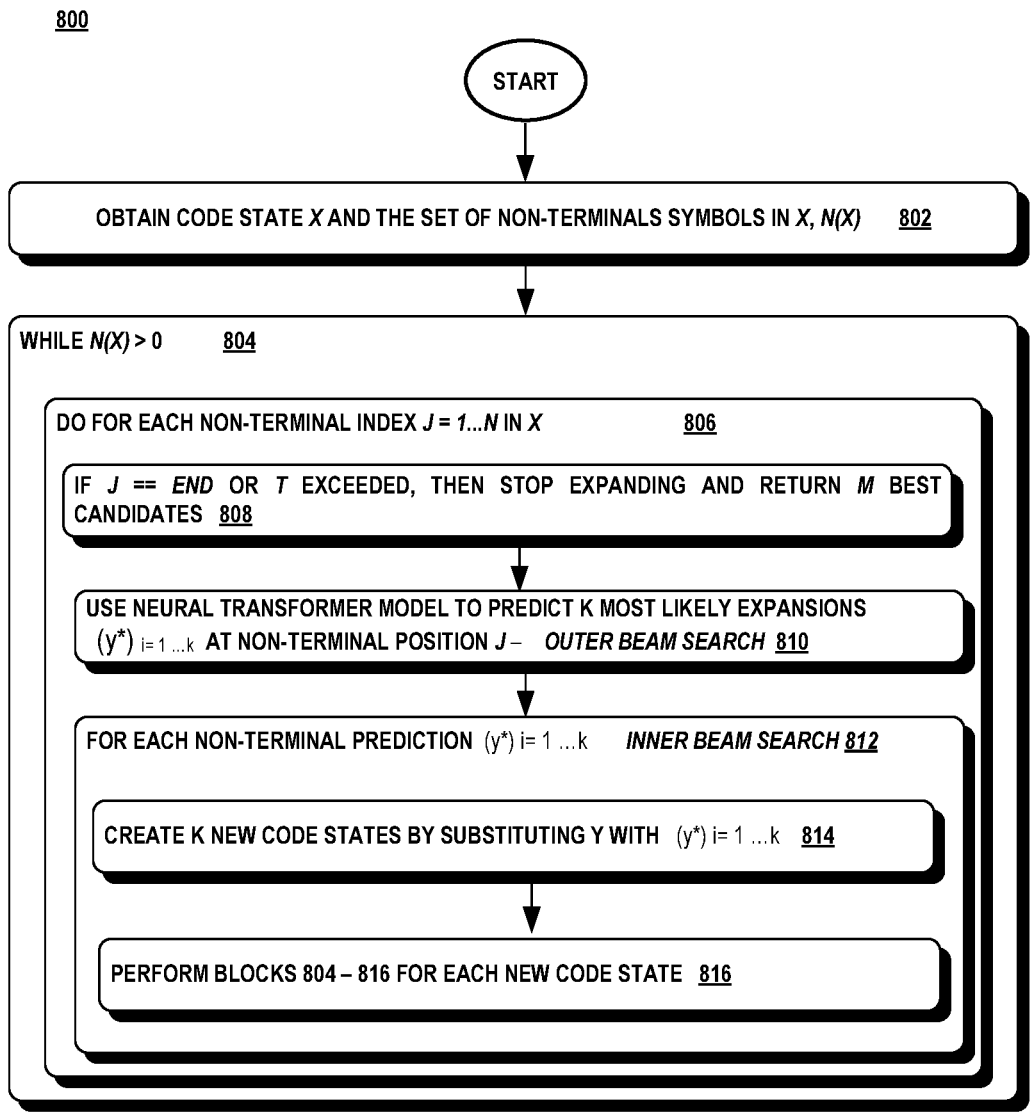
FIG. 8 illustrates an exemplary method for performing a nested beam search to generate a candidate with a hole to complete a partially-formed code snippet.

Turning to FIG. 8, there is shown an exemplary method 800 of the nested beam search used to generate a candidate with or without holes. The method accepts an input sequence of terminal and non-terminal symbols representing a code state of the program, $x=x_1, x_2, \ldots, x_n$, where $x_i \in \Gamma \cup \mathcal{L}$, where $\Gamma$ is the set of terminal symbols, and $\mathcal{L}$ is the set of non-terminal symbols. The grammar of the programming language is defined as $(\Gamma, \mathcal{L}, S, R)$, where S is the root symbol of the grammar and R is the set of production rules of the grammar. Let $N(x)=\{i | x_i \in \mathcal{L}\} \cup \{\emptyset\}$, which is the set of all the positions of the non-terminal symbols in x and the special symbol $\emptyset$ which denotes when the input sequence should not be expanded any further.

The method 800 uses a nested beam search having an outer beam search and an inner beam search. The outer beam search uses the neural transformer model iteratively to generate the k most probable expansions for each non-terminal symbol in the original input sequence x, where an expansion applies a learned production rule that results in a non-terminal symbol or terminal symbol replacing the non-terminal symbol in the original input sequence x. The inner beam search uses the neural transformer model to iteratively expand each of the k most probable expansions generated by the outer beam search by substituting a symbol to replace a non-terminal symbol and creating a new input sequence for the outer beam search to predict the next expansion.

The method 800 starts with an input sequence that represents a current code state x which contains a set of non-terminal and terminal symbols, $x=x_1, x_2, \ldots, x_n$, and $N(x)$ which represents the positions of the non-terminal symbols in x (block 802). The process iterates for each non-terminal in the current or original code state x that is identified by the non-terminal index j when j is not the end symbol (blocks 804, 806, 808).

When all the non-terminals of the input sequence x have been expanded, the M best candidates are returned. The neural transformer model generates a probability distribution for each non-terminal and terminal symbol in the model's vocabulary which is used to select the k most likely expansions. Each candidate that results from an expansion has an accumulated probability that is the sum of the probabilities from each expansion. The M best candidates are the candidates with the highest accumulated probabilities, where M is a pre-configured threshold. (Collectively, block 808).

For each non-terminal of the input sequence, the neural transformer model predicts the k most likely expansions of the non-terminal position j, denoted as $(y^*)_{i=1 \ldots k}$, where k is the beam width of the beam search (block 810). This is also considered the outer beam search of the nested beam search.

For each of the non-terminal predictions $(y^*)_{i=1 \ldots k}$, (block 812), k new code states $x'_i$ are generated by performing an expansion that substitutes y with $(y^*)_{i=1 \ldots k}$ (block 814). For each of the new code states $x'_i$, having a non-terminal that needs to be expanded, the process repeats blocks 804-816 to predict further expansions (block 816).

When there are no further non-terminals in a code state that need to be expanded or the threshold confidence T of the beam search has been exceeded, the top M candidates having the highest probability are returned (block 808).

Code Completion with Holes Example

Figure 9A:
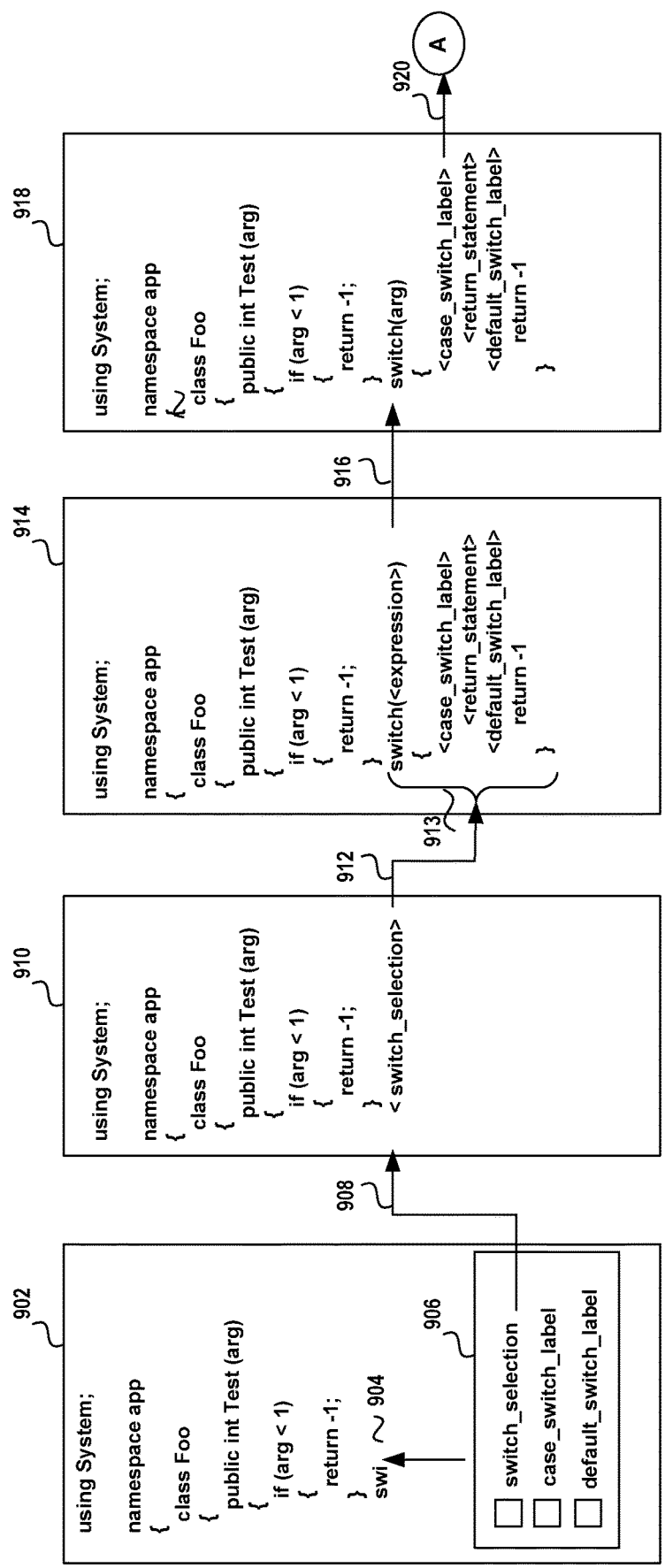
FIGS. 9A-9B are schematic diagrams illustrating the use of the neural transformer model to predict source code to complete a source code snippet.
Figure 9B:
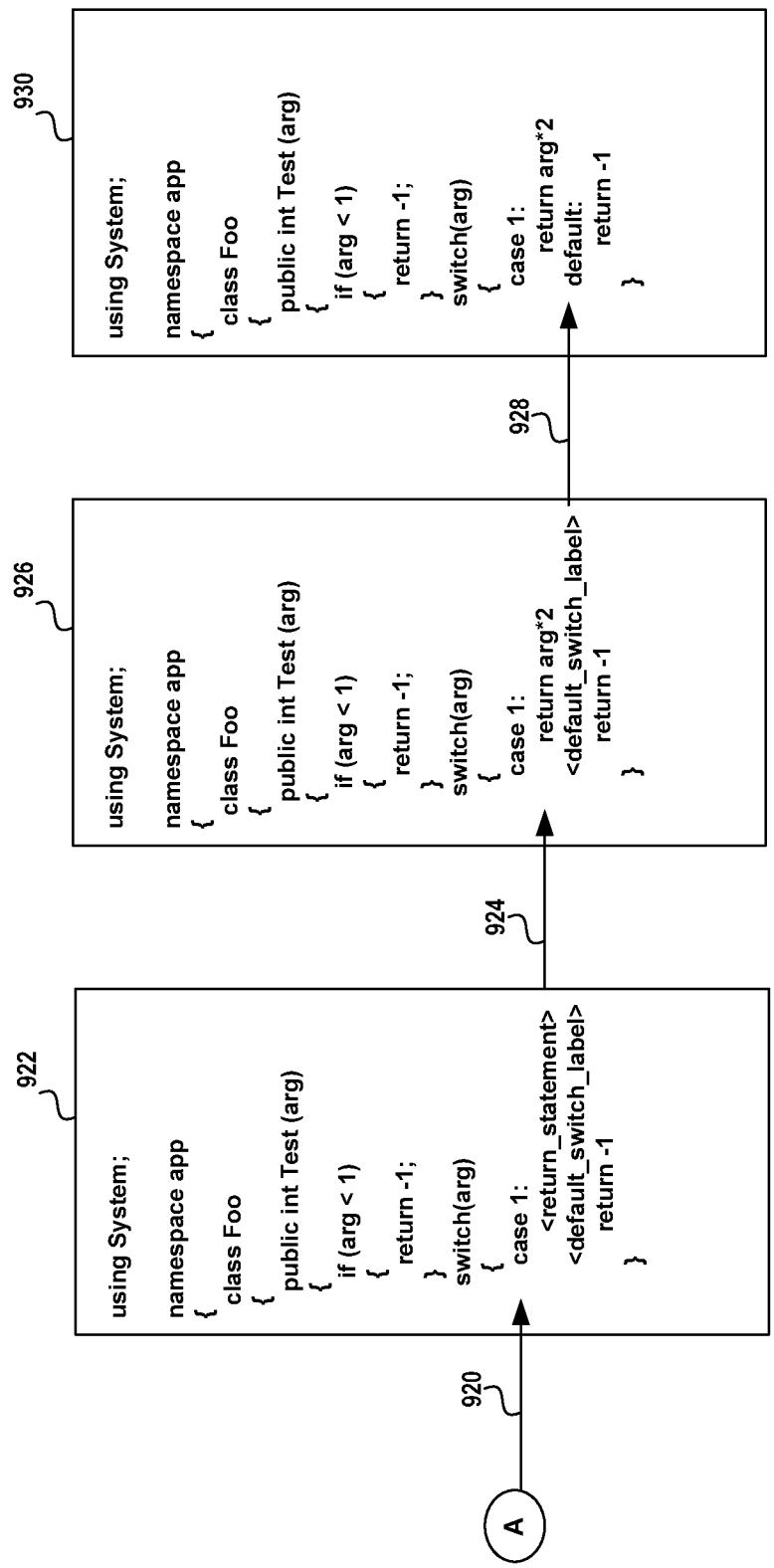

Attention now turns to an example of the techniques described herein used in a code completion system. Turning to FIGS. 9A-9B, there is shown a user interface containing a source code program written in the Python programming language being edited in a source code editor 902. As the user enters the string "swi" 904, the code completion engine searches the non-terminal list for non-terminals matching the string "swi". A pop-up window 906 appears with three non-terminal candidates, switch_selection, case_switch_label, and default_switch_label.

The user selects switch_selection 908 and the code completion engine generates a candidate 912 to complete the string "swi" as shown in display 910. The candidate 912 has a hole <switch_selection> which is a non-terminal in the grammar of the programming language that needs to be expanded. The user selects the hole <switch_selection> and the code completion engine generates the candidate 913 shown in display 914. The candidate 913 contains several holes, <expression>, <case_switch_label>, <return_statement>, and <default_switch_label>.

The user selects the non-terminal or hole, <expression> 916, and the code completion engine generates the candidate "arg" to complete the expansion of <expression> as shown in display 918. The user then selects the non-terminal <case_switch_label> 920 and the code completion engine predicts the terminal symbol candidate "case 1:" to complete the expansion of the non-terminal <case_switch_label> 920 as shown in display 922.

The user then selects the non-terminal <return_statement> 924 and the code completion engine generates the candidate "return arg*2" as shown in display 926. The user then selects the next non-terminal <default_switch_label> 928 and the code completion system generates the candidate "default" to complete the expansion as shown in display 930.

Exemplary Operating Environment

Figure 10:
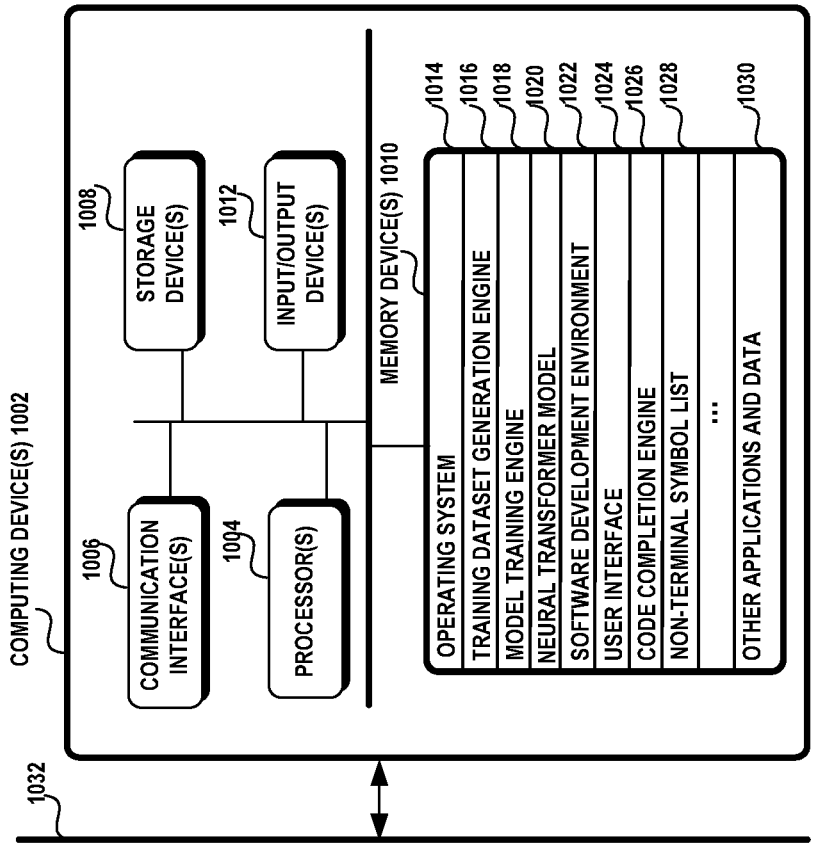
FIG. 10 is a block diagram illustrating an operating environment.

Attention now turns to a discussion of an exemplary operating environment. FIG. 10 illustrates an exemplary operating environment 1000 in which one or more computing devices 1002 are used to train the neural transformer model and use the neural transformer model for code completion. However, it should be noted that the aspects disclosed herein is not constrained to any particular configuration of devices. Computing devices 1002 may be configured as a cloud service that generates the neural transformer model as a service for other code completion systems or uses the neural transformer model in its own code completion system. It should be noted that the operating environment is not limited to any particular configuration and other configurations are possible.

A computing device 1002 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 1000 may be configured in a network environment, a distributed environment, a multi-processor environment, or a stand-alone computing device having access to remote or local storage devices.

A computing device 1002 may include one or more processors 1004, one or more communication interfaces 1006, one or more storage devices 1008, one or more input/output devices 1012, and one or more memory devices 1010. A processor 1004 may be any commercially available or customized processor and may include dual microprocessors and multi-processor architectures. A communication interface 1006 facilitates wired or wireless communications between the computing device 1002 and other devices. A storage device 1008 may be computer-readable medium that does not contain propagating signals, such as modulated data signals transmitted through a carrier wave. Examples of a storage device 1008 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 1008 in the computing devices 1002. The input/output devices 1012 may include a keyboard, mouse, pen, voice input device, touch input device, display, speakers, printers, etc., and any combination thereof.

A memory device or memory 1010 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory may also include one or more external storage devices or remotely located storage devices that do not pertain to propagated signals, such as modulated data signals transmitted through a carrier wave.

A memory device 1010 may contain instructions, components, and data. A component is a software program that performs a specific function and is otherwise known as a module, program, and/or application. The memory device 1010 may include an operating system 1014, a training dataset generation engine 1016, a model training engine 1018, a neural transformer model with attention 1020, a software development environment 1022, a user interface 1024, a code completion engine 1026, a non-terminal symbol list 1028 and other applications and data 1030.

A computing device 1002 may be communicatively coupled via a network 1032. The network 1032 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portion of the Public Switched Telephone Network (PSTN), plain old telephone service (POTS) network, a wireless network, a WiFi® network, or any other type of network or combination of networks.

The network 1032 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

CONCLUSION

A system is disclosed comprising: one or more processors; and a memory that stores one or more programs configured to be executed by the one or more processors, the one or more programs including instructions to perform acts that: obtain a plurality of partial code states, wherein a partial code state represents a partial expansion of production rules applied to a source code snippet, wherein a partial code state includes at least one non-terminal symbol and zero or more terminal symbols, wherein the production rules are associated with a grammar of a programming language; and train a deep learning model, with the plurality of partial code states, to learn the production rules of the grammar of the programming language in order to predict most likely expansions of non-terminal symbols of a partially-formed code snippet given a current code state of the partially-formed code snippet.

In an aspect, the one or more programs include further instructions to perform acts that: associate with each of the plurality of partial code states, an index of a non-terminal expansion, and a true non-terminal expansion; and train the deep learning model with the index of the non-terminal expansion and the true non-terminal expansion of each of the plurality of partial code states.

In an aspect, the one or more programs include further instructions to perform acts that: generate a parse tree for each of a plurality of source code snippets of the programming language, the parse tree including non-terminal symbols and terminal symbols of the grammar of the programming language; and extract the plurality of partial code states from the parse tree of each of the plurality of source code snippets.

In an aspect, the deep learning model is a neural transformer model with attention.

In an aspect, the neural transformer model with attention includes a plurality of encoder blocks and a plurality of decoder blocks.

In an aspect, the one or more programs include further instructions to perform acts that: generate an encoder output from the one or more encoder blocks, wherein the encoder output includes an annotation indicating a non-terminal expansion index corresponding to each input sequence, the encoder output used by a decoder block to compute an attention score.

In an aspect, the one or more programs include further instructions to perform acts that: compute at a first decoder block, an attention score based on a bias term, wherein the bias term is associated with a select non-terminal expansion index.

A method performed on a computing device having a processor and a memory is disclosed, where the method comprises: obtaining a partially-formed source code snippet of a source code program in an edit session; and generating a candidate to complete the partially-formed source code snippet, wherein the candidate includes a syntactically-correct sequence of one or more symbols to complete the partially-formed source code snippet, wherein the syntactically-correct sequence includes at least one non-terminal symbol of a grammar of a programming language of the source code program.

In an aspect, the method further comprises: outputting the candidate in the edit session; and obtaining a selection of the candidate from a user of the edit session.

In an aspect, the method further comprises: extracting a string of characters from the partially-formed source code snippet; searching for a non-terminal symbol matching the string of characters from a list of non-terminal symbols of the grammar of the programming language of the source code snippet; and constructing the candidate from a closest matching non-terminal symbol from the list of non-terminal symbols.

In an aspect, the method further comprises: generating a second candidate to complete the selected candidate, wherein the second candidate expands at least one non-terminal symbol in the selected candidate to a terminal symbol or to a non-terminal symbol.

In an aspect, the method further comprises: performing a nested beam search to determine expansion of the non-terminal symbol in the selected candidate.

In an aspect, the nested beam search utilizes a neural transformer model with attention to predict most likely expansions for the non-terminal symbol based on an output probability distribution generated by the neural transformer model with attention.

In an aspect, the method further comprises: deriving all expansions for the selected candidate to produce a plurality of candidates, a first subset of the plurality of candidates having an ordered sequence of terminal symbols and an associated probability; and selecting k top candidates from the plurality of candidates, wherein the k top candidates have a highest probability out of the plurality of candidates.

A device is disclosed comprising: a processor and a memory. The processor is configured to perform acts that: obtain a candidate to complete a partially-formed source code snippet of a source code program in an editor, wherein the candidate includes a syntactically-correct sequence of symbols including at least one non-terminal symbol of a grammar of a programming language of the source code program; expand the at least one non-terminal symbol in the candidate to generate sequences of non-terminal symbols and/or terminal symbols that can be derived from iteratively expanding the at least one non-terminal symbol in accordance with production rules of the grammar of the programming language of the source code program; and select one or more of the generated sequences to complete the partially-formed source code snippet.

In an aspect, the processor is configured to perform acts that: perform a nested beam search to determine expansion of the at least one non-terminal symbol.

In an aspect, the processor is configured to perform acts that: utilize a neural transformer model with attention within the nested beam search to predict k most likely expansions of the at least one non-terminal symbol given a code state of the partially-formed source code snippet.

In an aspect, the neural transformer model with attention outputs a probability for each non-terminal symbol and terminal symbol, wherein the probability indicates a likelihood for expanding the at least one non-terminal symbol given the code state of the partially-formed source code snippet.

In an aspect, the processor is configured to perform acts that: for each of the k most likely expansions of the at least one non-terminal symbol, generate new code states by performing each of the k most likely expansions; and iteratively expanding each of the new code states.

In an aspect, the code state of the partially-formed source code snippet includes a select number of tokens preceding the at least one non-terminal symbol, a method of the partially-formed code snippet, or the source code program.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system for code completion, comprising:
a processor; and a memory that stores a program configured to be executed by the processor, the program including instructions to perform acts that:
detect a partially-formed source code snippet in a source code program, wherein the source code program is associated with a programming language, wherein the programming language comprises a grammar having a plurality of production rules, wherein a production rule comprises an ordered sequence of symbols, wherein a symbol comprises a terminal symbol or a non-terminal symbol; represent the partially-formed source code snippet as a partial code state, wherein the partial code state comprises at least one non-terminal symbol;
generate a first candidate to complete the partially-formed source code snippet, wherein the generation of the first candidate iteratively expands each non-terminal symbol of the partial code state and each subsequently-generated partial code state until a termination condition exists, wherein the expansion of a non-terminal symbol is based on a probability output from a deep learning model given a respective partial code state, wherein the probability output from the deep learning model is conditioned on the respective partial code state and non-terminal symbol being expanded, wherein the expansion produces a subsequently-generated partial code state that replaces a select non-terminal symbol in accordance with a select production rule without constraint to a left-to-right expansion order; and upon existence of the termination condition, output the partial code state or subsequently-generated partial code state having a highest accumulated expansion probability as the first candidate, wherein the first candidate comprises a hole, wherein the hole is a non-terminal symbol that the deep learning model is uncertain on how to expand.

2. The system of claim 1, wherein the program includes instructions to perform acts that:
upon user selection of the first candidate, augment the partially-formed source code snippet with the first candidate; and
generate a second candidate to complete the hole.

3. The system of claim 2, wherein generating the second candidate to complete the hole includes instructions to perform acts that: predict top-k expansions for each non-terminal symbol of the second candidate based on a probability output from the deep learning model given the second candidate; and generate subsequently-generated partial code states from the top-k expansions of each non-terminal symbol.

4. The system of claim 1, wherein the highest accumulated expansion probability comprises an aggregation of each probability output from the deep learning model for each expansion.

5. The system of claim 1, wherein the program includes instructions to perform acts that: terminate the generation when the probability output by the deep learning model fails to meet a confidence threshold.

6. The system of claim 1, wherein the program includes instructions to perform acts that:
obtain the partially-formed source code snippet in an edit session of the source code program.

7. The system of claim 1, wherein the program includes instructions to perform acts that:
obtain a string of characters input by a user of the source code program;
find at least one non-terminal symbol that matches the string of characters; and
upon user input selecting the at least one non-terminal symbol, construct the partially-formed source code snippet from tokens preceding the selected at least one non-terminal symbol.

8. A computer-implemented method of code completion, comprising:
obtaining a partially-formed source code snippet in an edit session of a source code program, wherein the source code program is associated with a programming language, wherein the programming language comprises a grammar having a plurality of production rules, wherein a production rule comprises an ordered sequence of symbols, wherein a symbol comprises a terminal symbol or a non-terminal symbol;
transforming the partially-formed source code snippet in a partial code state, wherein the partial code state comprises at least one non-terminal symbol;
searching for a first candidate to complete the partially-formed source code snippet, wherein the search of the first candidate iteratively expands each non-terminal symbol of the partial code state and each subsequently-generated partial code state until a termination condition exists, wherein the expansion of a non-terminal symbol is based on a probability output from a deep learning model given a respective partial code state, wherein the probability of an expansion is conditioned on the respective partial code state and non-terminal symbol being expanded, wherein the expansion produces a subsequently-generated partial code state that replaces a select non-terminal symbol in accordance with a select production rule without constraint to a left-to-right expansion order; and
upon existence of the termination condition, displaying the partial code state or subsequently-generated partial code state having a highest accumulated expansion probability as the first candidate, wherein the first candidate comprises a hole, wherein the hole is a non-terminal symbol that the deep learning model is uncertain to expand.

9. The computer-implemented method of claim 8, further comprising:
upon user selection of the first candidate, augmenting the partially-formed source code snippet with the first candidate; and
searching for a second candidate to complete the hole.

10. The computer-implemented method 9, wherein searching for the second candidate to complete the hole further comprises:
predicting top-k expansions for each non-terminal symbol of the second candidate based on a probability output from the deep learning model given the second candidate;
expanding each non-terminal symbol in accordance with the predicted top-k expansions into partial code states; and
for each partial code state having a non-terminal symbol, iteratively expanding the non-terminal symbols in each partial code state until each partial code state comprises all terminal symbols.

11. The computer-implemented method of claim 8, wherein the highest accumulated probability comprises an aggregation of each probability output from the deep learning model for each expansion.

12. The computer-implemented method of claim 8, further comprising: terminating the search when the probability output by the deep learning model fails to meet a confidence threshold.

13. The computer-implemented method of claim 8, further comprising:
obtaining the partially-formed source code snippet in an edit session of the source code program.

14. The computer-implemented method of claim 8, further comprising:
obtaining a string of characters input by a user in the source code program;
finding at least one non-terminal symbol that matches the string of characters; and
upon user input selecting the at least one non-terminal symbol, constructing the partially-formed source code snippet from tokens preceding the selected at least one non-terminal symbol.

15. A hardware storage device having stored thereon computer executable instructions that are structured to be executable by a processor of a computing device to thereby cause the computing device to perform actions that:
obtain a partially-formed source code snippet of a source code program associated with a programming language, wherein the programming language comprises a grammar having a plurality of production rules, wherein a production rule comprises symbols, wherein a symbol comprises a terminal symbol or a non-terminal symbol;
represent the partially-formed source code snippet as a partial code state, wherein the partial code state comprises a sequence of symbols with at least one non-terminal symbol; and
search for a first candidate to complete the partially-formed source code snippet, wherein the search performs actions that:
predict top-k expansions for each non-terminal symbol of the partial code state based on a probability output from a deep learning model given the partial code state, wherein the probability of an expansion is conditioned on the partial code state and a select non-terminal symbol being expanded, wherein the expansion replaces the select non-terminal symbol in accordance with a select production rule;
expand the select non-terminal symbol in accordance with the predicted top-k expansions into partial code states without constraint to a left-to-right expansion order;
for each partial code state having a non-terminal symbol, repeat the predict and the expand actions until a termination condition is met; and
output a partial code state as the first candidate based on a highest accumulated expansion probability, wherein the first candidate comprises a hole, wherein the hole is a non-terminal symbol that the deep learning model is uncertain to expand.

16. The hardware storage device of claim 15, having stored thereon computer executable instructions that are structured to be executable by a processor of a computing device to thereby cause the computing device to perform actions that: upon user selection of the first candidate, augment the partially-formed source code snippet with the first candidate; and search for a second candidate to complete the hole.

17. The hardware storage device of claim 16, having stored thereon computer executable instructions that are structured to be executable by the processor of the computing device to thereby cause the computing device to perform actions that:
generate top-k expansions for each non-terminal symbol of the second candidate based on a probability output from the deep learning model given the second candidate; perform expansions of each non-terminal symbol in accordance with the predicted top-k expansions into partial code states; and for each partial code state having a non-terminal symbol, repeat the generating and performing actions until a partial code state is generated comprising all terminal symbols.

18. The hardware storage device of claim 15, wherein the highest accumulated probability comprises an aggregation of each probability output from the deep learning model for each expansion.

19. The hardware storage device of claim 15, having stored thereon computer executable instructions that are structured to be executable by the processor of the computing device to thereby cause the computing device to perform actions that:
terminate the search when the probability output by the deep learning model fails to meet a confidence threshold.

20. The hardware storage device of claim 15, having stored thereon computer executable instructions that are structured to be executable by the processor of the computing device to thereby cause the computing device to perform actions that: obtain the partially-formed source code snippet in an edit session of the source code program.

* * * * *